United States Patent [19]

Evans et al.

[11] 4,218,356
[45] Aug. 19, 1980

[54] PRODUCT OF AND PROCESS FOR POLYMERIZING AN AQUEOUS REACTION MIXTURE CONTAINING IONIZING AGENT AND COSOLVENT THAT FORMS AN AQUEOUS DISPERSION OF RESINOUS POLYELECTROLYTE

[75] Inventors: James M. Evans, Lynn Haven, Fla.; Carlos E. Ortiz, Medina, Ohio

[73] Assignee: SCM Corporation, Cleveland, Ohio

[21] Appl. No.: 954,225

[22] Filed: Oct. 24, 1978

Related U.S. Application Data

[63] Continuation-in-part of Ser. No. 920,770, Jun. 30, 1978, abandoned, which is a continuation-in-part of Ser. No. 844,739, Oct. 25, 1977, abandoned, which is a continuation-in-part of Ser. No. 577,916, May 15, 1975, abandoned.

[51] Int. Cl.$^2$ ............................................. G08L 33/02
[52] U.S. Cl. .................. 260/29.6 TA; 204/159.23; 204/159.24; 260/29.4 UA; 260/29.6 HN; 260/29.6 N; 260/29.6 H; 260/29.6 NR; 260/29.6 E
[58] Field of Search ............... 204/159.23, 159.24; 260/29.4 UA, 29.6 TA, 29.6 HN, 29.6 N, 29.6 H, 29.6 NR, 29.6 E

[56] References Cited

U.S. PATENT DOCUMENTS

| | | | |
|---|---|---|---|
| 2,661,331 | 12/1953 | Howard | 204/159.24 |
| 2,662,875 | 12/1953 | Chaney | 260/29.6 TA |
| 3,265,654 | 8/1966 | Glabisch et al. | 260/29.6 TA |
| 3,271,373 | 9/1966 | Wolff | 260/29.6 TA |
| 3,297,618 | 1/1967 | Glabisch et al. | 260/29.6 E |
| 3,308,081 | 3/1967 | Glabisch | 260/29.6 TA |
| 3,311,583 | 3/1967 | Bearden | 260/29.6 E |
| 3,458,466 | 7/1969 | Lee | 260/29.6 TA |
| 3,501,432 | 3/1970 | Wright et al. | 260/29.6 TA |
| 3,515,657 | 6/1970 | Nakanome et al. | 204/159.24 |
| 3,523,792 | 8/1970 | Delzenne et al. | 204/159.24 |
| 3,721,636 | 3/1973 | Makower | 260/29.6 RW |
| 3,798,194 | 3/1974 | McCann et al. | 260/29.6 E |
| 3,853,803 | 12/1974 | Anderson et al. | 260/29.6 TA |
| 3,862,075 | 1/1975 | Sekmakas | 260/29.6 TA |
| 3,862,096 | 1/1975 | Kitamura et al. | 260/29.6 TA |
| 3,929,750 | 12/1975 | Eishun et al. | 260/874 |
| 3,968,037 | 7/1976 | Morgan et al. | 210/47 |

*Primary Examiner*—Maurice J. Welsh
*Attorney, Agent, or Firm*—Merton H. Douthitt; Joseph M. Hageman

[57] ABSTRACT

A resinous copolymer polyelectrolyte product is produced by a process for addition polymerization of reactants having from about 0.0005 to 0.0050 neutralization equivalents of ionizable monomer per gram. The aqueous reaction mixture for polymerization contains both a cosolvent in proportions low enough to avoid formation of a solution of the polyelectrolyte in the final aqueous medium and an ionizing agent sufficient to ionize at least about 0.0001 neutralization equivalent of said ionizable monomer. The polyelectrolyte has a mean weight average not substantially in excess of 100,000 molecular weight.

13 Claims, No Drawings

PRODUCT OF AND PROCESS FOR POLYMERIZING AN AQUEOUS REACTION MIXTURE CONTAINING IONIZING AGENT AND COSOLVENT THAT FORMS AN AQUEOUS DISPERSION OF RESINOUS POLYELECTROLYTE

This application is a continuation-in-part of copending application Ser. No. 844,739 filed Oct. 25, 1977, now abandoned, which itself was a continuation-in-part of Ser. No. 577,916 filed May 15, 1975, now abandoned; and is also a continuation-in-part of copending application Ser. No. 920,770 filed June 30, 1978, now abandoned, which itself was a continuation-in-part of the previously mentioned application Ser. No. 844,739.

BACKGROUND OF THE INVENTION

Heretofore, it has been conventional practice to make water-insoluble resinous polyelectrolyte by various emulsion, suspension, solution, or bulk polymerization processes, then to disperse or dissolve it in aqueous medium by adding an appropriate ionizing agent, either basic or acidic. The instant process not only manifestly saves such post-polymerization dispersing or dissolving step, but also produces a resinous polyelectrolyte with a narrower molecular weight distribution than most corresponding solution or bulk polymerizations (no high molecular weight "tail"), and a lower average molecular weight than a corresponding emulsion polymerization, while also eliminating the surfactant required in emulsion or suspension polymerization. The instant polymerization does not appear to be diffusion controlled as are emulsion polymerizations, nor is it truly typical of a solution or bulk polymerization operation, although it might be theorized as a new type of dispersion polymerization with water as the vehicle for the resulting ionized electrolyte.

The aqueous dispersions of polyelectrolytes produced by this process are particularly useful in coatings to be applied by electrophoretic deposition. Products of this process can be useful for coating various substrates, e.g. sanitary coatings for metal cans or coatings for wood.

BRIEF STATEMENT OF THE INVENTION

Basically this invention is a process for the production of an aqueous dispersion of resinous polyelectrolyte wherein said polyelectrolyte is formed by the addition polymerization of addition polymerizable reactants under addition polymerization conditions, at least a part of said reactants having a functional group ionizable in water that contains an ionizer of electrically opposed type, and the resulting polymer is neutralized in aqueous medium with an ionizing agent effective for neutralizing at least a portion of the functional groups of the resulting polymer, this resulting polymer being substantially insoluble in water or the aqueous medium described hereinafter. One version of the process comprises establishing and maintaining an agitated body of aqueous medium containing cosolvent at polymerization temperature and pressure; adding said ionizing agent to said body in advance of or concurrently with said reactants; adding said reactants to said body; and polymerizing in said body said reactants by free-radical catalysis until said resinous electrolyte is formed.

Another version of the invention is a process for producing an aqueous dispersion of resinous polyelectrolyte from addition polymerizable reactants, about 5 to 30% by weight of said reactants having a functional group ionizable in water containing an ionizer therefor, said process comprising:

(a) adding said reactants, an ionizing agent for said functional group, and a cosolvent to a body of aqueous medium and (b) polymerizing said reactants to form said resinous polyelectrolyte by free radical catalysis in said body, where (i) said aqueous dispersion contains substantially no surfactant, (ii) said ionizing agent is added to said body in advance of or concurrently with said reactants and in sufficient amount to ionize at least about 20% of said functional groups of said resinous polyelectrolyte, and (iii) said cosolvent is added in sufficiently small proportion that said resinous polyelectrolyte is substantially insoluble in said aqueous medium.

Still another version is a process for addition polymerizing normally liquid addition polymerizable reactants, including an ionizable reactant, without substantial surfactant which comprises:

establishing and maintaining an agitated reaction mixture comprising:
water,
at least about 0.05 part of cosolvent per part of said water, but insufficient cosolvent to cause a substantial proportion of the resulting addition polymerized resinous polyelectrolyte product to form a clear solution in said water,
at most about one part of said polymerizable reactants per part of said water, said reactants having 0.0005–0.005 neutralization equivalent of an ionizable monomer per gram, and sufficient ionizing agent to ionize at least about 0.0001 neutralization equivalent of said ionizable monomer;
polymerizing by free-radical catalysis said reactants in said reaction mixture at temperature of about 25°–300° C., and under pressure sufficient for suppressing ebullition of said reaction mixture, thereby yielding a substantially surfactant-free aqueous dispersion of said addition polymerized resinous polyelectrolyte product, said resinuous polyelectrolyte product having mean weight average not substantially greater than 100,000 molecular weight.

A further aspect of the invention is the product of any of the processes of the present invention with the mean weight average of the resulting polymer being not substantially above about 100,000 molecular weight.

DETAILED DESCRIPTION OF THE INVENTION

The most common reactants for this operation are vinyl and acrylic materials, usually monomers, and more generally those having a reactive $>C=C<$ grouping. While they can be oligomers or prepolymers of fairly low molecular weight, e.g. up to about 4,000 or so, ordinarily, for economy and efficiency, they are monomeric. Acetylenic materials also are often suitable for reactants, as are allylic ones.

The vinyl monomers most useful for practicing this invention include esters of acrylic and methacrylic acid and these acrylic acids themselves, for example: methylmethacrylate, ethylmethacrylate, 2-ethylhexylmethacrylate, butylacrylate, isobornyl acrylate, isobutyl methacrylate; and the corresponding hydroxy acrylates, eg., hydroxy ethylacrylate, hydroxy propyl acrylate, hydroxy ethylhexyl acrylate; also the glycol acrylates, eg., ethylene glycol dimethacrylate, hexamethylene glycol dimethacrylate; the allyl acrylates, eg., allyl methacrylate, diallyl methacrylate, methallyl methacrylate; the epoxy acrylates, eg., glycidyl methacrylate; and the aminoplast acrylates, eg., melamine acrylate.

Other suitable classes of vinyl monomers include vinyl acetate, vinyl and vinylidine halides, eg., vinyl chloride, vinylidine chloride; amides, eg., methacrylamide, acrylamide, diacetone acrylamide; hydrocarbons, eg., butadiene, isoprene, styrene, vinyl toluene and so forth.

Another class of unsaturated compounds which can be polymerized by using this invention and is, therefore, included in the term "vinyl monomers" are polyunsaturated compounds such as unsaturated polyesters capable of being crosslinked with sytrene. Cross-linkable unsaturated polyesters are widely known and reported in the art. Typically, they are derived by the reaction of a polyhydric alcohol and an alpha,beta-unsaturated dicarboxylic acid or anhydride thereof. Examples of polyhydric alcohols suitable for making this class of polyesters include; glycerin, propylene glycol, hexanediol, glycerol, pentaerythritol, trimethylolpropane, glycol ethers, and so forth. Examples of alpha,beta-unsaturated dicarboxylic acids or their anhydride counterparts which are also useful in making the polyester include: maleic, fumaric, itaconic, and citraconic.

If an anionic resinous polyelectrolyte is to be made, the reactants should include a fair proportion of ionizable carboxyl or a lesser proportion of other acidic groups, eg., sulfonic acid, phosphonic acid, etc., generally at least a few weight percent of the total reactants and upwards to 30% or more when the acid groups are carboxylic. If oppositely-reacting groups are present in a reactant such as amino groups, the acidic groups in such reactant should predominate over them. For efficiency and economy, acidic compounds are preferably incorporated into the resinous polyelectrolyte by means of acrylic acid and/or methacrylic acid monomer units or vinyl sulfonic acid, the latter often in sodium salt form.

Similarly, if a cationic resinous polyelectrolyte is to be made, the reactants should include basic functionality as with, say, at least about 5 to about 30% or more by weight of reactants having primary, secondary, or tertiary amino groups. Amino groups are preferably incorporated into the resinous polyelectrolyte by using units of tertiary, secondary or primary amino acrylates and methacrylates and amino-functional methacrylamides and acrylamides, eg., dimethyl aminoethyl methacrylate or acrylates, or dimethylaminopropyl acrylamide or methacrylamide.

The ionizer for acidic groups in reactants, such as carboxylic acid groups, clearly should be a base, advantageously a water soluble one such as ammonia, an aliphatic, aromatic, or heterocyclic mono or polyamine, an alkanolamine, an alkali or alkaline earth metal hydroxide such as potassium sodium, lithium or calcium hydroxide, or the like. The amines can be primary, secondary or tertiary, preferably monofunctional, amines. Also possible bases include quaternary ammonium hydroxides, hydrazines, and hydroxylamines. Ionizers for a cationic resinous polyelectrolyte and its precursor reactants clearly are acid, preferably a carboxylic acid such as lactic, acetic, formic, or even a mineral acid such as hydrochloric acid, phosphoric acid, sulfuric acid or the like. It is sometimes advantageous to employ a volatile ionizer, especially when the product is to be used as part of a surface coating composition.

Where the free radical catalysis is done by use of added peroxides or persulfates, it is distinctly advantageous to have any basic nitrogen in the reaction mixture entirely neutralized with acid groups present, that is, to have at least enough carboxyl or other acidic groups to neutralize all the equivalents of basic nitrogen present either as an ionizer or as a reactant. Advantageously a slight excess of acidic groups is used in these circumstances to prevent rapid destruction of the catalyst. Not all of the ionizable functional groups of the resulting polymer need be ionized; the process is effective with such imbalance. Ordinarily at least about 20% and often 25–40% and even 40–90% of the functional groups are ionized in the resulting polymer, and in some cases all are. Preferably at least about 0.0001 equivalents of the ionizable groups per gram of reactants present in either unpolymerized or polymerized form should be ionized at every stage of the polymerization process.

The aqueous medium can be simply water. It is advantageous to add a small amount of one or more cosolvents such as a few percent, e.g. from about 5% upwards to about 30% of isopropanol or upwards to about 10% of 2-butoxy-ethanol-1 or about 25% of isobutanol, methyl isobutyl ketone, or isophorone, these percentages being based on the total weight of the aqueous reaction medium. A small percentage of hydrocarbon solvent, e.g. benzene or $C_{5-10}$ paraffins also can be tolerated, these usually being blended with the reactants. The presence of such cosolvent appears to facilitate reaction and to stabilize the dispersion, but not so much should be used that actual solution of the resulting resinous polyelectrolyte would occur in the aqueous reaction medium. The presence of too little cosolvent will permit the resinous polyelectrolyte to coagulate into intractable masses, sometimes even giving the appearance of gelation of the entire body of reaction mixture. The presence of too much cosolvent may lead to formation of a true solution of the resinous polyelectrolyte in the aqueous medium, which will be accompanied by a substantial reduction in the turbidity of the mixture and by a substantial rise in its viscosity.

Addition polymerization conditions of temperature are broadly about 0° to 300° C. and preferably about 25° to 120° C.; the pressure useful is often atmospheric, but can be subatmospheric if too many volatile materials are not distilled off, and it can be superatmospheric, e.g. up to 10,000 psig, where necessary to restrain escape of water or other volatile materials. The ionizer conveniently can be added to the body of aqueous medium preparatory to the polymerization operation or concurrently with the addition polymerizable reactants, e.g. as a separate feed or in admixture with such polymerizable reactants. Where all or any portion of the reactants are introduced into the reaction mixture before polymerization conditions are established therein, then, of course, the order of addition of reactants and ionizer under those circumstances is immaterial, so long as ionizer is present throughout the polymerization reaction in proportions sufficient to ionize at least about 0.0001 neutralization equivalents of the ionizable portion of the reactants per gram of reactants and product present.

The percent of resinous polyelectrolyte product in the aqueous vehicle can be quite low, if desired, and advantageously it is about 20–50%, although in some cases it can be higher, e.g. up to about 60%. The reaction mixture will become turbid as polymerization proceeds and will remain so, corresponding in appearance to an emulsion rather than a solution. The viscosity will remain quite low, depending somewhat on the overall concentration of resinous polyelectrolyte product, again corresponding to an emulsion rather than a solution. We refer to this state of matter as a "dispersion" without intending thereby to be limited to any specific description of the precise morphology on a microscopic scale which produces these readily observable macroscopic characteristics.

The preferred free radical catalysis is performed by physically adding catalysts such as a peroxide, a persulfate, an azobis compound such as azobisobutyronitrile, or redox system such as a persulfate/bisulfite (often activated by oxidation as with ferric ions), a peroxide/amine, persulfate/thiosulfate, benzoyl peroxide/ferrous ammonium sulfate/sorbose, or an organic trivalent or tetravalent vanadium compound (e.g. of a betadiketone)/mercaptan (as shown in U.S. Pat. No. 3,516,976).

Another way for achieving free radical catalysis is with ionizing radiation, such as from an electron beam having 1 to 10 megarads directed into the reaction mixture. Still another way is to put into the mixture an ultraviolet sensitizer, such as benzoquinone or a thioxanthone compound and an azine compound as shown in U.S. Pat. No. 3,857,769 or a 2,2'-dithiobis(benzothiazole) and an aromatic carbonyl compound such as shown in U.S. Pat. No. 3,847,771 (in the proportions called for in those patents), then beaming onto the reaction mixture an ultraviolet beam of wavelength of, say, 3000 to 4000 Å. In the instance where the free radicals are generated by radiation, and especially by UV radiation with a sensitizer, it is advantageous to use an extremely shallow reaction vessel at the irradiation point or area (e.g. a transparent sidearm for circulation of mixture with a few mm. of flow thickness) so that the wave energy can penetrate thoroughly enough, particularly when pigments are present.

A variety of other materials can be included in this reaction mixture, usually blended with the reactants and added to the reaction with them. Typically, neutral resin particles, droplets of liquid resin, or resin dissolved in the monomer reactants can be used, said resin being non-reactive during the instant polymerization. Such resins typically include polyolefin particles, other hydrocarbon resins such as coumarone-indene, polybutadiene or polyisoprene, butadiene/isoprene, etc. If desired, such resin can be a latent crosslinker such as an aminoplast or an epoxide resin or phenolic resin which is useful for crosslinking with acid or hydroxyl functionality in either cationic or anionic resinous polyelectrolytes upon subsequent heating or intensive radiation or at lower temperature by means of a latent catalyst. Such crosslinker can even be a portion of the reactants which copolymerize during the addition polymerization and is later activated to crosslink, e.g. glycidyl acrylate or methacrylate. Such latent crosslinker does not have to be restricted to being a resin; it can be benzene 1,4 bisoxazoline, a capped or blocked polyisocyanate, etc. Preferably it is resinous, however. If the resulting aqueous dispersion of resinous polyelectrolyte is acidified naturally or by addition of acids, the subsequent reaction of aminoplast resin with the hydroxyl or carboxyl groups is greatly facilitated.

Initially the reaction mixture can be pigmented with inert pigments and fillers, suitable by adding pigment as a suspension in the reactants. Pigmentation can be opacifying, such as titanium dioxide of about 0.3 micron average particle size, or it can be a relatively inert dye, filler, or pigment such as a silicate, an iron oxide, clay, talc, silica, Organosol RL dye (a product of Ciba-Geigy Company), carbon black, lead chromate, wood flour, glass beads or flakes, treated aluminum powder or leaf, etc.

At the end of the polymerizing operation it may be desired to concentrate the resulting aqueous dispersion. This can be done most advantageously by distilling water and/or cosolvent from the reaction mixture under reduced pressure to a point where the viscosity of the distilland leaves it still easy to handle, at least when heated. Alternatively, the ionizer can be decomposed, removed by distillation, etc., or neutralized with a material having greater activity than the resinous polyelectrolyte for this purpose, e.g. barium hydroxide to neutralize sulfuric acid ionizer for a resinous cationic polyelectrolyte or strong mineral acid such as sulfuric to precipitate resinous anionic polyelectrolyte dispersed with an alkyl monoamine. Then the resinous polyelectrolyte will precipitate out as a coalesced somewhat aqueous substance, and much of the aqueous usually superlatent layer can be decanted off.

The following examples show ways in which this invention has been practiced, but should not be construed as limiting the same. In the specification all parts are parts by weight, all temperatures are in degrees Centigrade, and all percentages are weight percentages unless otherwise expressly shown.

The reactor used was a one-liter glass flask equipped with a stirrer, overhead vented condenser, thermometer, nitrogen gas inlet, and an electrical heater. It was charged initially with 180 grams of deionized water and 30 grams of the cosolvent indicated. These contents were preheated with agitation to 75° C. In a separate vessel the reactants (monomers) were blended with neutralizer, and the catalyst was added either as a blend with the monomers or as a separate feed in water solution as indicated. The monomer-bearing blend and catalyst were added dropwise to the agitated aqueous medium over a period upwardly to about 3 hours to prevent the exothermic heat of reaction from raising temperature of the reaction mixture beyond 85° C. (Where such exothermic heat is not appreciable, the monomers and catalysts can be added in a very few minutes). The reaction was blanketed with nitrogen gas. After the monomers were added, agitation was continued and temperature held at 80° C. to substantially complete the addition polymerization.

EXAMPLE 1

The following mixture of monomers was prepared:

| | |
|---|---|
| Styrene | 35.5 grams |
| Ethyl acrylate | 45.3 grams |
| Hydroxyethyl acrylate | 10.0 grams |
| Methacrylic acid | 9.2 grams |

Into this blend was mixed 3.2 grams of dimethylethanolamine. The catalyst (2 grams of ammonium persulfate dissolved in 20 grams of water) was added separately and concurrently. The cosolvent with the water initially in the reactor was 30 grams of isopropanol.

The resulting resinous polyelectrolyte was an opaque, homogeneous dispersion exhibiting opalescene.

It had about 30% non-volatile matter upon drying, and it exhibited initially about 100 cps viscosity at 25° C. Addition of a little more amine did not make the viscosity increase as would have been expected for an anionic polyelectrolyte solution. After storage for one month at 120° F., the viscosity increased to 200 cps at 25° C. where it seemed to stabilize. The batch with addition of 15 grams of hexamethoxymethyl melamine resin and adjustment of viscosity by dilution or concentration could be used for flow coating, curtain coating, dip coating, or spray coating onto wood, metal, plastic, or glass. The resulting deposited film could be dried and heat cured for 20 minutes at 350° F. to form a durable protective film.

When there is dissolved 10–30 grams of an epoxy resin, e.g. Epon 1001 (a product of Shell Chemical Company), films of the resulting mixture of epoxy resin and resinous polyelectrolyte are similarly curable.

EXAMPLE 2

The following mixture of monomers was prepared:

| Styrene | 28 grams |
|---|---|
| Ethyl acrylate | 42 grams |
| N-isobutoxymethyl acrylamide | 20 grams |
| Methacrylic acid | 10 grams |

Into this blend was mixed 3.6 grams of dimethylethanolamine and catalyst (2 grams of ammonium persulfate dissolved in 20 grams of water), which was added separately and concurrently. The cosolvent with the water initially in the reactor was 22.5 grams of isobutanol and 7.5 grams of isopropanol.

The resulting resinous polyelectrolyte had the same visible characteristics as that of Example 1. Initially the viscosity of the completed reaction mixture was 26 seconds No. 4 Ford cup at 25° C. Storage for a month at 120° F. still left the material in sprayable condition. The product was sprayed without further modification to give a coating film that was self-curable in 5 minutes at 350° F. drying and baking.

EXAMPLE 3

This operation was conducted like Example 1 except that: 0.7 gram of 2-acrylamido-2-methylpropane sulfonic acid was added to the monomer mixture to enhance acidity of the resulting polymer and to promote cure with post-added melamine resin; and 3.3 grams of dimethylethylamine was used to neutralize.

The resulting resinous polyelectrolyte exhibited visual characteristics similar to that of Example 1. However, when the hexamethoxymethylmelamine resin was added to the batch, the coating film made from the batch dried and cured to a durable protective film in 20 minutes at 250° F.

EXAMPLE 4

This run was done like Example 1 except that the catalyst (2 grams of azobis isobutyronitrile) was admixed with the monomers. The resulting aqueous dispersion of resinous polyelectrolyte performed very much like that of Example 1.

EXAMPLE 5

When dimethylaminoethyl methacrylate is substituted in the recipe of Example 1 for the methacrylic acid in an equimolar quantity, and lactic acid substituted for the dimethylethanolamine, also in an equimolar quantity, and the operation conducted otherwise alike, the product is a resinous cationic polyelectrolyte in aqueous dispersion. When applied as a coating like that of Example 1, a durable protective film can be made by drying and heat curing in a similar manner.

The above Example 1 had a product that was characterized by mean weight average of the resulting polymer being about 40,000. All of the resinous copolymer polyelectrolytes produced by the instant process would produce polymers with the mean weight average not substantially in excess of 100,000 molecular weight.

The instant resins ordinarily can't be made very readily in concentrations above about 35% by weight in the water-cosolvent mixture, and generally will be in about 20–30% maximum concentration. The viscosity of the dispersion increases markedly with concentration (i.e. the resin exhibits solute properties), especially when the ionizing monomer constitutes at least about 10% by weight of the resin product. The resin dispersion is highly sensitive to cosolvent used in order to get a maximum concentration of resin at room temperature, which dispersion easily stirred and has extended storage stability.

In the sense used in this application "surfactant" for the process means added surfactant as distinguished from a material generated during the process which might have surface active properties.

We claim:

1. A process for addition polymerizing normally liquid addition polymerizable reactants, including an ionizable reactant, without substantial surfactant which comprises:
   establishing and maintaining an agitated reaction mixture comprising:
      water,
      at least about 0.05 part of cosolvent per part of said water, but insufficient cosolvent to cause a substantial proportion of the resulting addition polymerized resinous polyelectrolyte product to form a clear solution in said water,
      at most about one part of said polymerizable reactants per part of said water, said reactants having 0.0005–0.005 neutralization equivalent of an ionizable monomer per gram, and sufficient ionizing agent to ionize at least about 0.0001 neutralization equivalent of said ionizable monomer;
   polymerizing by free-radical catalysis said reactants in said reaction mixture at temperature of about 25°–300° C., and under pressure sufficient for suppressing ebullition of said reaction mixture, thereby yielding a substantially surfactant-free aqueous dispersion of said addition polymerized resinous polyelectrolyte product, said resinous polyelectrolyte product having mean weight average not substantially greater than 100,000 molecular weight.

2. A process according to claim 1 wherein said ionizable monomer is ionizable to form an anion.

3. A process according to claim 2 wherein said ionizable monomer contains an ionizable carboxylic acid group.

4. A process according to claim 1 wherein said ionizable monomer is ionizable to form a cation.

5. A process according to claim 4 wherein said ionizable monomer contains an ionizable amine group.

6. A process according to claim 1 wherein said reactants do not contain a quaternary ammonium, phosphonium or sulfonium group.

7. A process according to claim 1 wherein said ionizable monomer does not contain mutually ionizable groups either on the same or on different molecular species of said ionizable monomer.

8. A process according to claim 1 wherein said reactants do not contain a quaternary ammonium, phosphonium or sulfonium group and said ionizable monomer does not contain mutually ionizable groups, either on the same or on different molecular species of said ionizable monomer.

9. A process according to claim 1 wherein a preformed polyelectrolyte or substantially the same composition as the resinous polyelectrolyte being produced is incorporated into said reaction mixture before completion of said polymerization.

10. A process according to claim 9 wherein said preformed polyelectrolyte is incorporated into said reaction mixture before commencing said polymerization.

11. A process according to claim 1 wherein said reactants comprise at least one non-ionizable monomer.

12. A resinous copolymer electrolyte, made by addition polymerization of addition polymerizable monomers including an ionizable one in an aqueous dispersion of cosolvent and ionizing agent for said ionizable monomer, produced substantially without surfactant according to claim 1, said electrolyte having mean weight average not substantially in excess of 100,000 molecular weight.

13. An aqueous dispersion of the at least partially ionized electrolyte of claim 12.

* * * * *